A. D. WELKER & L. E. SNYDER.
POTATO PLANTER.
APPLICATION FILED FEB. 27, 1915.
1,161,560.
Patented Nov. 23, 1915.
3 SHEETS—SHEET 2.
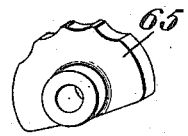
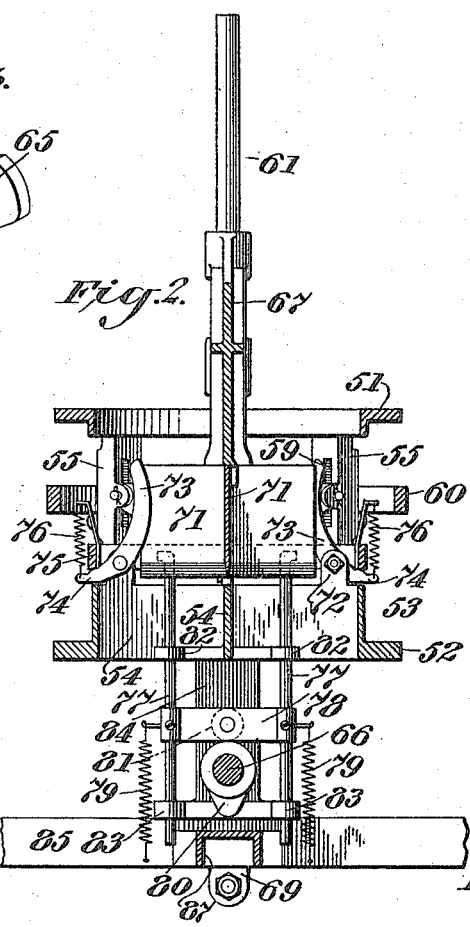
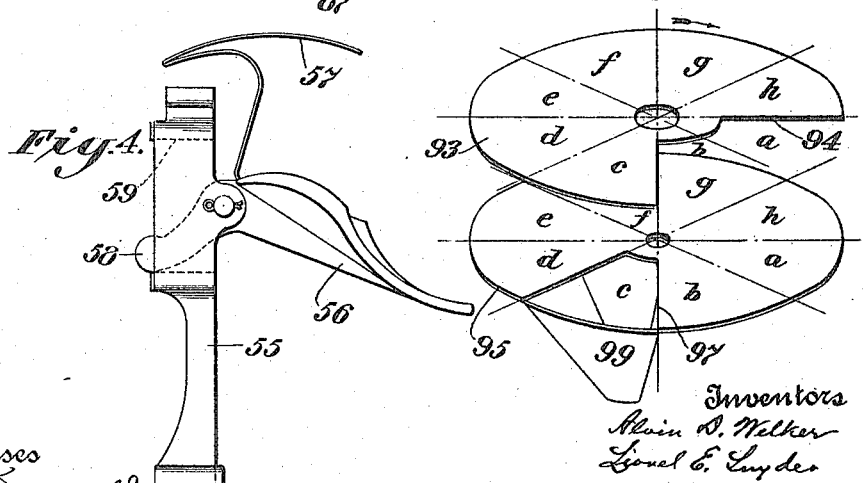

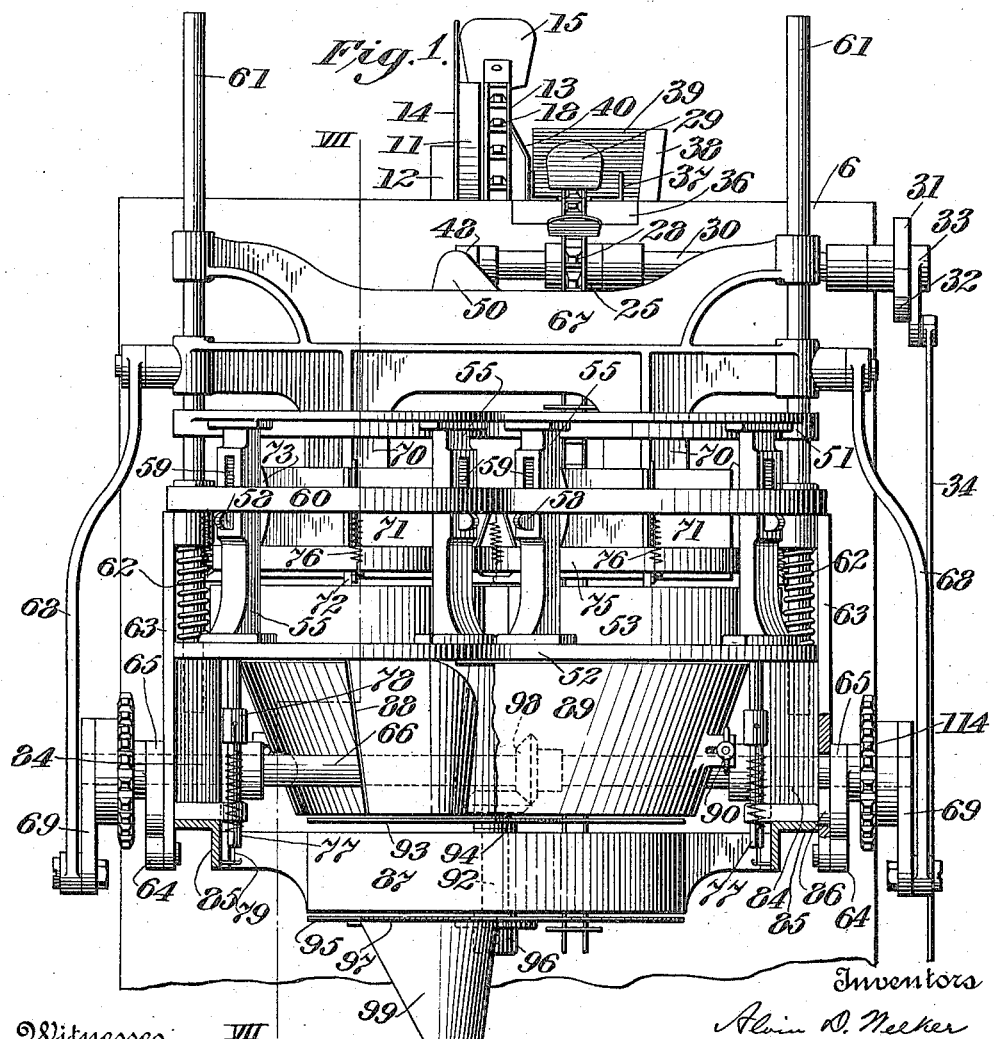

A. D. WELKER & L. E. SNYDER.
POTATO PLANTER.
APPLICATION FILED FEB. 27, 1915.
1,161,560.
Patented Nov. 23, 1915.
3 SHEETS—SHEET 3.
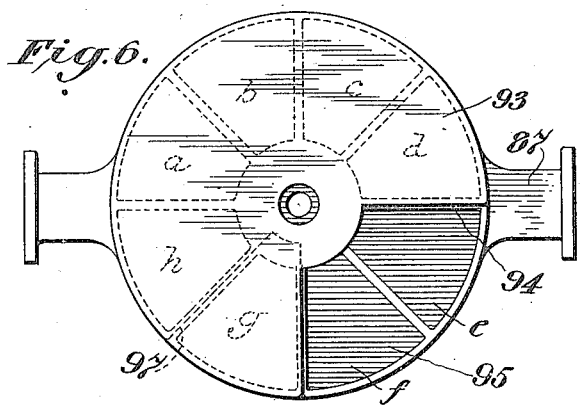
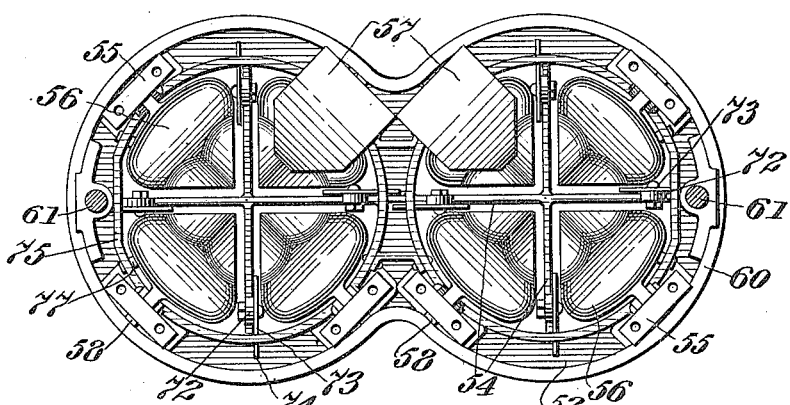

UNITED STATES PATENT OFFICE.

ALVIN D. WELKER AND LIONEL E. SNYDER, OF WADSWORTH, OHIO.

POTATO-PLANTER.

1,161,560.   Specification of Letters Patent.   Patented Nov. 23, 1915.

Application filed February 27, 1915. Serial No. 11,095.

*To all whom it may concern:*

Be it known that we, ALVIN D. WELKER and LIONEL E. SNYDER, citizens of the United States, residing at Wadsworth, in the county of Medina and State of Ohio, have invented a certain new and useful Improvement in Potato-Planters, of which the following is a full, clear, and exact description.

The object of this invention is to provide a machine for cutting, dropping and planting potatoes accurately and with little or no waste, regardless of the speed at which the machine may be operated. Horse-drawn planters are subjected to variations in speed owing to the gait of the draft animals, and it is not convenient and in some cases it is impossible to gear the machine to adapt its operating parts to differences in speed of the draft animals, so as to insure regular and uniform operation without waste.

In a prior invention patented April 15, 1913, No. 1,058,821, we used a single cutting box, and while this proved to be very successful in actual use, it was found that when the draft animals unduly quickened their pace, the cutting and dropping of the potatoes were not satisfactory. Primarily the present invention is designed to remedy this difficulty, and the invention further improves the machine of the patent referred to.

Broadly stated, the invention consists of a potato planter of the type mentioned, having a double cutting box and the necessary accessories to render it efficient in properly cutting and uniformly dropping potatoes one piece at a time at regular intervals, regardless of team speed, as we will proceed now to explain and finally claim.

In accordance with the requirements of the Patent Office the claims for the double cutting box and the means connected therewith for discharging the cut potatoes systematically are retained herein, while the mechanism for supplying or feeding the potatoes to the double cutting box is divided out of this case and made the subject of an application filed July 23, 1915. Serial No. 41,495.

In the accompanying drawings illustrating the invention, in the several figures of which like parts are similarly designated, Figure 1 is a rear elevation of the cutting and dropping mechanism and some of the adjacent parts. Fig. 2 is a vertical cross-section of the cutting and dropping mechanism, taken substantially on the line VII, Fig. 1. Fig. 3 is a perspective view of one of a pair of cams for use in agitating the gates in the cutting box. Fig. 4 is a side elevation of one of the gates having a cut-off, and its supporting stand. Fig. 5 is a perspective view of the pair of disks which control the dropping of the cut pieces of potatoes and showing the relative fixed position of their openings. Fig. 6 is a top plan view of the receiving chamber with the disks shown in Fig. 5 mounted thereon, the opening (97) in the lower disk being shown in dotted lines. Fig. 7 is a top plan view of the base, centering fingers and gates and the rings for operating each of the latter two. Fig. 8 is a top plan view of the receiving chamber and the partitions for directing the pieces of cut potatoes from the eight compartments of the base to the respective eight compartments of the receiving chamber, the base, which is above, being shown in dotted lines in the interest of clearness.

It will be understood that it is not intended to limit the invention to any particular division of the double cutting box and the chambers; and yet the invention may be most easily used by following the herein shown division. So also the invention is not limited to details of construction. All these and other variations are intended to be within the scope of the claims herein.

The machine has a suitable frame for supporting the various parts, and in the preferred construction the machine includes a hopper for the seed potatoes, and means for properly transferring the potatoes from the hopper or supply to a receiver which is interposed between the transferring means and the cutting box, as more particularly set forth in the divisional application above mentioned. In Fig. 1 some of these parts are shown in part, as for example, the hopper 6, the elevator elements 11, 12, 13, 14, 15, 18, the conveyer elements 25, 28, 29, 30, 31, 32, 33, 34, and the associated parts 36, 37, 38, 39, 40, the element 50 of the receiver and the cam 48 for tilting it, for a complete explanation of which reference is made to said divisional case.

Beneath the receiver 41 is a double cutting apparatus, to which the potatoes are delivered one at a time, and by which they are cut into four, more or less, pieces, and whence the pieces are discharged to the planting mechanism forming part of the machine. This cutting apparatus comprises the top frame piece 51 and a base 52, said base having a vertical circumferential flange 53 and divided into compartments by the intersecting vertical partitions 54. The frame piece 51 and base 52 are connected by eight, more or less, stands 55 in which are pivotally mounted gates 56 of spade-like contour and substantially quadrantal in outline, so that when four of these gates are assembled adjacent to one another and side by side, they cover a substantially circular space, and thus form a movable bottom for each of the two boxes of the double cutting apparatus. The gates arranged beneath the receiver 41 are provided with cut-offs 57 erected upon and standing over them, so as to prevent the entrance of potatoes into the cutting boxes until the cutters are ready to receive and act upon them. These gates are provided with tail-pieces 58 projecting through vertical slots 59 in the stands 55, and these tail-pieces are engaged by a ring 60 which is mounted to slide upon vertically disposed rods 61 erected on the base 52 and said ring is supported on the rods by means of springs 62 but normally held down against the tail-pieces 58 by means of depending slides 63 having rollers 64 at their ends which are engaged by cams 65 on the countershaft 66. These cams, as shown in detail in Fig. 3, are provided with a corrugated active surface or a series of lumps, so as to give the gates an up and down vibratory motion to aid in centering the potatoes directly under the cutting knives to be described. The rods 61 also support and guide a cross-head 67 of the knives, and this cross-head is connected by links 68 with crank-arms 69 on the shaft 66, whereby a vertically reciprocating motion is imparted to the knives as the shaft is rotated. This cross-head 67 has the depending centers 70 to which are attached the cruciform knives 71. These knives separate the gates from one another and with them divide each cutting box into four compartments, as shown more in detail in Fig. 7.

On the partition 54 of the base 52 are ears 72 to which are pivoted the fingers 73 which extend up into the cutting boxes alongside of the knife blades and have outwardly extending tail-pieces 74 which are engaged by a ring 75 and retracting springs 76. The ring 75 is connected by push-rods 77 to bars 78, and these bars are connected by springs 79 with a portion of the frame, as shown in Fig. 2. On the shaft 66 are the wiper-cams 80 which coöperate with the bars 78, as through rollers 81 thereon, to lift the push-rods and hence the ring 75 so as to permit springs 79 to act upon the fingers 73 to force them inwardly toward the center of the cutting boxes, this movement of the fingers 73 occurring coincidently with the agitation of the gates, and the two forces coöperating to insure the proper centering of the potatoes under the knives. The push-rods 77 are supported and guided in perforated lugs 82 extending inwardly from the base 52 and similar inwardly extending lugs 83 at the bases of the bearing pieces 84 which depend from the base 52 and rest upon the inner longitudinal frame members 85.

The bearing pieces 84 not only serve to support the base 53, but also afford bearings for the shaft 66 and serve to receive and support the rods 61. The slides 63 move vertically along the bearing pieces 84 and they are slotted at 86 for the passage of the shaft 66 through them.

Between the inner frame members 85 is supported the receiving chamber 87 which is circular in horizontal section and is arranged centrally below the double cutting box. This chamber is divided into as many compartments as there are compartments in the double cutting box, as here shown, in Fig. 6, eight in number. Interposed between the receiving chamber 87 and the bottom (base 52) of the double cutting box are the vertically disposed partitions 88 and a surrounding casing 89, which casing is made in two parts and adapted to be united, as by bolts and ears 90, to inclose the space between the receiving chamber and the bottom of the double cutting box or base 53. These partitions together with their casing serve to divide the thus inclosed space between the receiving chamber 87 and the base 53 into an equal number of compartments with the compartments in the double cutting box and the receiving chamber 87. These partitions may be disposed around and some or all of them secured to a centrally arranged lug or cone 91 on the receiving chamber 87, or some of them may be fixed to the cone and others to the casing members.

Extending up through the receiving chamber 87 is a vertical shaft 92 on which is mounted a horizontal disk 93 having a quadrantal opening 94, and this disk is located between the bottom of the casing 89 and the top of the receiving chamber. Beneath the receiving chamber is located a similar disk 95 which is likewise mounted on the shaft 92 and supported by a flanged collar 96 thereon, and this disk 95 has a sector opening 97 which is arranged in advance of the opening 94 in the disk 93. The shaft 92 may be driven from the shaft 66 by miter gearing 98, or it may be otherwise rotated.

The disk 95 has a spout 99 depending from it which serves to direct the potato escaping through the opening 97 into the chute 100 or other agency by which the cut potatoes are directed to the planting appliances.

The machine may be equipped with any suitable planting appliances.

114 is a sprocket wheel on countershaft 66 by which it may be connected up with a source of power.

The operation is as follows: The potatoes to be planted are put into the hopper in any quantity, and then the elevator and conveyer are set in motion. As the elevator is moved upward through the potatoes in the hopper, it will carry up one or more of the potatoes, and at or before reaching the high point of the sprocket wheel 18 the potatoes will be roled off onto the conveyer. After the conveyer leaves the receiving box formed by the walls 38, 39, 40, any surplus potatoes carried by said conveyer will fall back into the hopper, due to the curved formation of the carriers 29 of the conveyer. These carriers are so spaced along the conveyer chain 25 that there is room between them for only one potato. The sides 37 are so spaced at each side of the conveyer that there is just room for one potato to pass. Any surplus potatoes carried by the conveyer from the receiving box must necessarily lie on top of its carriers, and, therefore, just as soon as these surplus potatoes leave the receiving box they will roll off over the sides into the hopper, and consequently it is impossible for surplus potatoes to be carried along by the conveyer to the cutting mechanism. It is to be emphasized, therefore, that when each carrier 29 reaches the sprocket wheel 28, there is one and only one potato to each space between adjacent carriers. Inasmuch as the sprocket wheel 28 has an intermittent motion, such that each motion will advance the chain 25 a distance equal to the space between any two adjacent carriers, it follows that for each motion a potato will be delivered. One motion of the sprocket wheel 28 will deliver the first potato into the tilting receiver, inasmuch as the receiver is in its horizontal receiving position, and the receiver will be immediately tilted to discharge it onto the cut-off 57 beneath it. The next motion of the sprocket wheel will deliver the second potato beneath the elevated end of the receiver and directly on top of that cut-off 57 which is beneath said end. Practically the two potatoes are delivered to the respective cut-offs at about the same time, and they remain on these cut-offs until the gates are operated. These cut-offs therefore hold the potatoes from escaping below them, and at this time the knives in the double cutting box rise into operative position and simultaneously the ring 60 descends and engages the tails of the gates, whereby the gates are drawn into closed position and their cut-offs moved outward so as to discharge the potatoes onto the gates, and then the fingers 73 operate to center the potatoes under the knives and the knives then descend and quarter each of the potatoes. When the knives are about in their extreme down position, the ring 60 begins to move upward thereby allowing the gates to suddenly drop, and thereby releasing the eight pieces of cut potatoes, which then drop directly through the compartments of the base 53. Six of these pieces of potatoes are guided by the partitions 88 onto the upper or distributing disk 93, while two of the pieces pass through the opening 94 in said disk into the compartments then beneath said opening, where they are held by the lower or discharging disk 95. From these two disks the eight pieces of potato are dropped one by one through the opening 97 in the lower disk and delivered by spout 99 attached to the under disk into a chute which leads to the planting furrow. The relation of the openings in the two disks to each other and the fact that the disks are rigidly fastened to one and the same shaft and rotate together, make the dropping of the pieces of cut potato from the cutting box uniform.

A definite relation of the moving parts and their operating elements is necessary in order to insure the proper timing of the parts.

There are eight compartments in the base 53; likewise eight compartments formed by the partitions or projections 88 and the encircling casing 90 arranged between the bottom of base 53 and the top of disk 93; and also eight compartments formed in the receiving chamber 87. For purposes of illustrating the operation of the discharge of the cut potatoes, we have divided diagrammatically the surfaces of the disks 93 and 95 to correspond with these compartments, and have designated them a, b, c, d, e, f, g, and h to correspond with the eight compartments in the parts previously described. The eight cut pieces of potato are delivered to these disks in such way that six pieces are caught on the upper disk and two pieces pass through the opening in the upper disk to compartments a and b over the lower disk 95. When the disks rotate, as indicated by the arrows, Fig. 5, the pieces of potato supported on the upper disk will drop through the opening in said disk into the compartments on the lower disk and in the following order, c, d, e, f, g, and h, and at the same time that the piece from compartment h reaches the lower disk, the opening in said disk allows the piece in compartment a to be discharged, as already explained, and while continuing its rotation, the opening in the lower disk will have passed under each compartment of the receiving chamber and dropped each piece successively.

The object in having the two disks and the receiving chamber so arranged is to get all of the pieces of cut potato onto the lower disk, so that each individual piece can be discharged through the lower disk under exactly the same conditions, thus obtaining a uniform dropping which insures equal spacing of the cut pieces in the furrow. The disadvantages of a single disk in dropping is that in delivering the first piece of cut potato through the opening, in the single disk, direct from gate to furrow, it will be dropped under different conditions from the other pieces, therefore causing two pieces to be dropped at practically the same time and making the planting uneven. With the double cutting and dropping mechanism of this invention, this uneven dropping is obviated.

We have thus described one practical embodiment of the invention, but we wish to be understood as not limiting our invention to the details of construction, excepting as such details are claimed in the claims hereinafter made.

What we claim is:—

1. In a potato planter, a double cutting box, gates pivotally mounted in connection with said double cutting box and forming movable bottoms therefor adapted to open downwardly, cut-offs on those gates next adjacent to the point of introduction of potatoes into the cutting box, vertically reciprocating knives arranged in said double cutting box, and means to move the gates to open and close the cutting box, the cut-offs on the gates serving to prevent the passage of uncut potatoes through the cutting box while the gates are open.

2. In a potato planter, the combination of a double cutting apparatus having a pair of vertically reciprocating knives, pivotally mounted gates adapted to be moved into position to afford supports for the potatoes while being cut and to discharge the cut potatoes, a cutting box base, a receiving chamber arranged beneath said base and divided into as many compartments as there are pieces of potato cut at any one operation of the knives, a distributing disk arranged below the base and above the receiving chamber and adapted to deliver cut pieces of potatoes successively to the several compartments in the receiving chamber, and a discharging disk moving with the distributing disk and adapted to discharge during such movement the cut pieces of potatoes one at a time.

3. In a potato planter, the combination of a double cutting apparatus having a pair of vertically reciprocating knives, pivotally mounted gates adapted to be moved into position to afford supports for the potatoes while being cut and to discharge the cut potatoes, a cutting box base, a receiving chamber arranged below the said base and divided into as many compartments as there are pieces of potatoes cut at any one operation of the knives, a series of inclosed compartments interposed between the base and the receiving chamber, a distributing disk interposed between the compartments and the receiving chamber and adapted to deliver cut pieces of potatoes successively to the several compartments in the receiving chamber, and a discharging disk arranged beneath the receiving chamber and moving with the distributing disk and adapted to discharge successively the cut pieces of potatoes one at a time.

4. In a potato planter, a double cutting box comprising a frame piece, a complemental flanged base, vertical stands connecting the frame piece and base, gates pivotally mounted in said stands and extending toward each other, a reciprocating cutting knife, means to operate said gates to afford a support for the potatoes being cut and to discharge the cut potatoes, and cut-offs on some of said gates adapted to be projected into the mouth of the cutting box to prevent the introduction of potatoes into the cutting box until the gates and knives are in position to respectively receive and act upon them, and means to discharge the cut pieces of potatoes one at a time.

5. In a potato planter, the combination of a cutting box having pivotally mounted gates therein adapted to be closed to support the potatoes while being cut and to be opened to discharge them, means to close said gates and to agitate them while closed to aid in centering the potatoes for the action of the cutting knives, pivotally mounted fingers arranged alongside of the gates, means to move said fingers to assist in centering the potatoes on the gates, and suitable cutting knives.

6. In a potato planter, the combination of a cutting apparatus in which potatoes may be cut into pieces suitable for planting, with means for discharging the cut pieces one at a time regardless of the speed of the machine, same comprising a chamber divided into as many compartments as there are cut pieces of potatoes, a receiving chamber to which the cut pieces of potatoes are delivered, a rotary delivery disk interposed between the receiving chamber and the compartmented chamber above it, and adapted to transfer the cut pieces of potatoes into the reciving chamber in a predetermined order, and a discharging disk at the bottom of the receiving chamber turning with the distributing disk and having a discharge opening capable of receiving and discharging one cut piece at a time.

In testimony whereof we have hereunto set our hands this 25th day of February, A. D. 1915.

ALVIN D. WELKER.
LIONEL E. SNYDER.

Witnesses:
AARON D. PARDEE,
A. M. BECK.